United States Patent [19]

Sidles

[11] Patent Number: 4,888,228
[45] Date of Patent: Dec. 19, 1989

[54] COMPOSITE LAMINATES COMPRISING MATRIX BOUND PLIES HAVING INTERLOCKED TRANSVERSE FIBERS AND A METHOD OF MAKING THE SAME

[75] Inventor: James Sidles, Richfield, Ohio

[73] Assignee: The B. F. Goodrich Company, Akron, Ohio

[21] Appl. No.: 237,354

[22] Filed: Aug. 29, 1988

[51] Int. Cl.[4] .................................................. B32B 3/02
[52] U.S. Cl. ........................................ 428/86; 156/72; 156/285; 428/96
[58] Field of Search ...................... 428/86, 96; 156/72, 156/285

[56] References Cited

U.S. PATENT DOCUMENTS

| | | | |
|---|---|---|---|
| 3,591,444 | 7/1971 | Hoppe | 428/86 |
| 3,940,524 | 2/1976 | Hoppe et al. | 428/86 |
| 4,563,378 | 1/1986 | Roth | 428/86 |

*Primary Examiner*—Marion C. McCamish
*Attorney, Agent, or Firm*—James R. Lindsay; Daniel J. Hudak

[57] ABSTRACT

Composite laminates having improved delamination resistance and useful for aircraft, marinecraft, automobiles, armor, and furniture are formed from plies of substrate which include fibers extending generally normal to the plane of the substrate. These plies of substrate can be, for example, tufted textiles wherein the tufts are formed by the fibers extending in the "z" direction. The fibers interlock with or are anchored in the substrate. Fibers from one ply intermesh with the fibers of an opposing ply. An organic binder sandwiched between the plies is cured to form the composite matrix. A method of making the laminates comprises applying the uncured binder to a tufted substrate to form a ply, stacking the plies, and applying heat and pressure to transform the binder to a matrix which substantially saturates the plies.

17 Claims, 2 Drawing Sheets

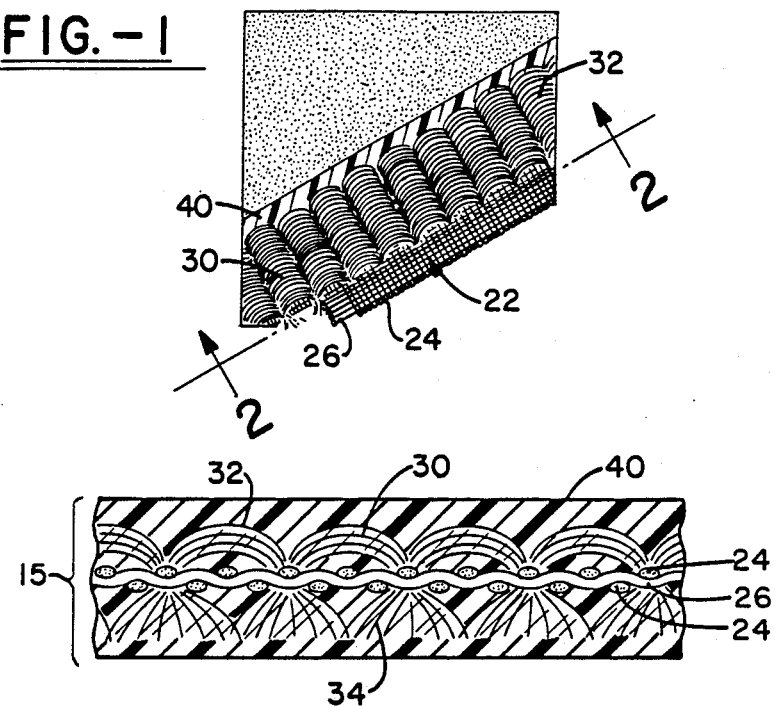
FIG.-1
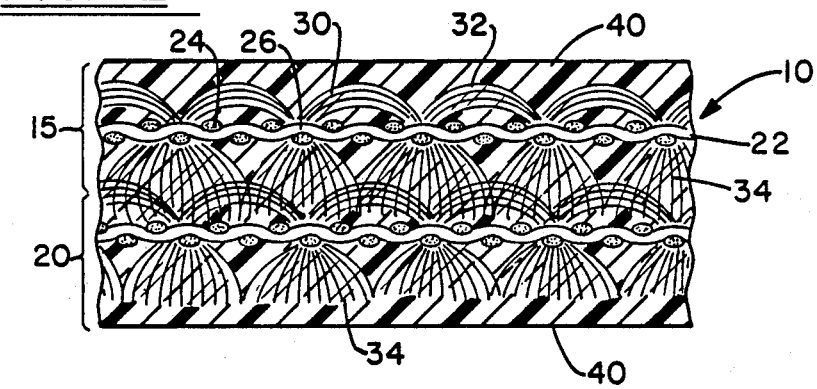
FIG.-2
FIG.-3

COMPOSITE LAMINATES COMPRISING MATRIX BOUND PLIES HAVING INTERLOCKED TRANSVERSE FIBERS AND A METHOD OF MAKING THE SAME

FIELD OF THE INVENTION

The present invention relates to composite laminates having improved delamination resistance. These improvements are achieved by using laminar plies comprising a substrate having transverse fibers such that the fibers of one ply cooperate with the fibers of an opposing ply to inhibit delamination. The invention further relates to methods of manufacturing the composite laminates.

BACKGROUND ART

Heretofore, composite laminates have been made using three-dimensional braiding or weaving of textile plies which are then saturated with a hardenable matrix. However, the equipment used to manufacture the textile is expensive and unreliable. Alternatively, substrates have been treated with flocking to form a matrix saturated laminate; however, in this technique, cracks tend to propagate along the base or the tip of the flocking which then separates from the substrate. Additionally, it is known to use oriented fibers in resin-saturated filament winding which results in three-dimensionally reinforced products.

SUMMARY OF THE INVENTION

It is therefore an aspect of the present invention to provide a composite laminate having improved delamination characteristics. These characteristics are measured, for example, by fracture toughness. The lamina may be used for structural reinforcement in land, air and marinecraft as well as armor, furniture, and buildings. The improvement in delamination resistance is achieved by constructing the matrix-saturated laminates of plies which comprise a planar substrate further incorporating fibers which extend in both directions from the plane of the substrate. At least one side of the substrate is coated with an organic binder, and a plurality of the plies are stacked so that the binder is in-between the plies. Heat and pressure are applied to the stack in order to set the binder. Fibers from one ply cooperate with fibers of an opposing ply. As a result of the improvements of the present invention, fracture toughness may be increased to 10, and desirably 15, and most preferably to 20 inch-pounds per square inch or higher.

BRIEF DESCRIPTION OF THE DRAWINGS

FIG. 1 is a top plan view of the composite laminate in accordance with the invention;

FIG. 2 is a cross-sectional view of the composite of FIG. 1;

FIG. 3 is a cross-sectional view of a first embodiment of a composite laminate in accordance with the invention;

DETAILED DESCRIPTION OF THE INVENTION

Figure 4:
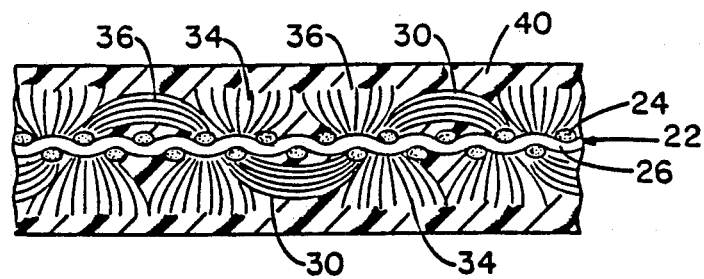
FIG. 4 is a cross-sectional view of a third embodiment of a composite laminate in accordance with the invention.

The present invention relates to composite laminates having opposing layers of a substrate incorporating fibers which extend in both directions from the plane of the substrate. The fibers of one layer or ply cooperate with the fibers of an opposing layer. A hardenable binder is applied to the substrate and fibers so that upon the application of setting or curing conditions, the resulting matrix substantially impregnates the interstices between the fibers of the opposing plies as well as the substrates.

The composite lamina of the invention are shown generally at 10 in FIG. 3 and comprise a first ply 15 and an opposing second ply 20. The plies are formed of a layer which is a substantially planar substrate 22 having a top side and a bottom side. The substrate 22 is shown as a woven ground cloth having warp and weft filaments 24, 26 respectively.

The ply 15 includes a plurality of fibers 30. The fibers 30 extend substantially normal to the plane of the substrate and beyond the surface of the substrate as defined by a plane passing tangentially to the top of the warp 24 and weft 26 filaments. The warp and the weft filaments extend in an X and a Y direction, and the fibers extend in a Z direction. It is desirable that the fibers 30 extend at 70 to 110 degrees, and more preferably 80 to 100 degrees to the plane of the substrate.

The fibers extend from either side (i.e., the top and bottom sides) of the substrate to form fiber tips 36 on either side of the substrate. The tips may be tufts 34 or loops 32. Collectively the tufts 34 will form a cut pile, while the loops 32 will form a looped pile.

In the first embodiment of the invention (FIGS. 1 and 2), the fibers form a loop 32 about the filaments 24 on one side of the substrate and form cut tufts 34 on the other side of the substrate. Alternatively, the fibers can be looped on both sides of the substrate or, as is shown in FIG. 4, may have cut tufts on both sides of the substrate. It is likewise envisioned that a single substrate may have combinations of looped and cut tufts on the same side. In each of the embodiments, it is important that the fibers extend through the substrate in such a way that they become interlocked or mechanically anchored to the substrate or ground cloth of the composite lamina. It is particularly easy to see that where the fibers are tufted on one side and looped on the other, the tensile forces in the Z direction are transmitted to the substrate through the loops.

The ply further includes an organic binder which is applied to one or both sides of the substrate. The first and second plies 15, 20 are stacked so that the binder 40 is dispersed between the plies and such that the fibers of the first ply 15 will cooperate with the fibers 30 of the second ply 20. It should be understood by the term "cooperation" that the fibers from one ply either contact or come into the vicinity of fibers or substrate from an opposing ply such that only a thin layer of binder separates the fibers. It may be preferable in the embodiment having cut tufts and looped fibers that the cut tufts oppose the looped fibers of an opposing ply in order to maximize the cooperation between the fibers of opposing plies Upon the application of proper conditions, i.e., heat and pressure, the binder 40 sets to form a matrix which substantially impregnates the plies. To the extent that the binder 40 is located between the plies, it can be said to be "sandwiched" between the plies. Of course, it should be understood that this term contemplates complete saturation as well as discrete layers of binder and ground cloth and all degrees of penetration therebetween. By "substantially impregnates" it is anticipated that the matrix will substantially fill the interstices between the fibers. It is preferable that the composite has no porosity and that the matrix saturates the substrate 22.

The substrate can be composed of a high tensile strength material. While it is preferable to use a woven material, it is anticipated that the material can include knit and non-woven materials. The substrate can be any suitable material having high tensile strength, such as carbon, glass, aramid, and polyester, with carbon and glass being preferred. The choice of particular substrate will depend on the weight, strength, and cost requirement of the final application.

The fibers pass through the plane of the substrate and preferably are anchored in the substrate such as by forming loops on one side of the substrate and cut tufts on the other. Alternatively if the fibers have cut tufts on both sides, it is preferable that the fibers interlock with the substrate such as by extending sufficiently through the plane of the substrate and having sufficient structural cooperation with the substrate in order to resist forces tending to pull the fibers in the Z direction.

In most applications, it is believed necessary to maximize strength of the composite in the X and Y direction, in which case the volume fraction of the fibers in the Z direction will be maintained at a relatively low percent, such as less than 15 percent, desirably 10 percent, and preferably 5 percent—as measured as a function of volume fraction of all the constituents. Of course, some uses may dictate different strength characteristics, requiring changes in these percentages. It is further preferable that the fibers have relatively short tufts, again to maximize the strength in the X and Y direction and minimize volume fraction of ply in the Z direction. A suitable range of height is 0.001 to 0.100 inches as measured from the top surface of the substrate. The top surface is a plane passing tangentially along the top of the material filaments constituting the substrate. It is believed to be ideal to provide a substrate having fine fibers which are uniformly spaced throughout the substrate material. Suitable fiber materials include glass, carbon, polyester, nylon, polyaramid, with preferred materials being glass and carbon fibers. The fibers may include a sizing, such as, for example, an aminosilane sizing for glass fibers.

The binder is applied to at least one side of the substrate in an amount sufficient to saturate the interstices of the plies after the binder has been cured. Thus, if two sides of opposing plies are coated with binder, it is desirable that the tips of the fibers on opposing sides are exposed. If on the other hand only one side of the substrate includes binder, the amount of binder can be increased so that the tips are no longer exposed. It is desirable to have a sufficient amount of binder to saturate the lamina, however, the cured matrix should not be so much that the fibers on opposing sides do not cooperate.

The binder may be any type of dimensionally stable binder at use temperature. It is preferable to use a hardenable plastic such as a thermoset, including, for example, epoxies or phenolics; and thermoplastics, including, for example, polyphenylenesulfide or polyether ether ketone. Preferred binders include epoxies and phenolics with epoxies being most preferred. The binder may be applied to one or both sides of the ply as a prepreg, that is, an uncured resin or unformed thermoplastic. The binder is subsequently cured or set by the application of heat and/or pressure to form a matrix which substantially saturates the lamina or plies. The binder may include conventional additives in conventional amounts. Exact choice of the binder will depend on the particular application of the final product. In some applications, it will be desirable to have high modulus strands or filaments with relatively high modulus matrix. However, a matrix with a lower modulus will be desired. In such case it may be advantageous to reduce the extent of crosslinking in a matrix such as an epoxy by the reduction of the amount of curative which is added.

The composite laminates of the present invention exhibit improved delamination characteristics. These characteristics are typically measured as fracture toughness and result in 10, and desirably 15, and preferably 20 inch-pounds or more of work required to create a square inch of new surface. The present invention has led to toughnesses as high as 50 inch-pounds per square inch.

A process used to make the lamina of the present invention can be described as follows. A ply is made by forming a substrate having fibers extending through the plane of the substrate. The fibers extending through the substrate thus form fiber tips on either side of the substrate. The fiber tips may be cut tufts or loops. The fibers may form loops on either side by tuft insertion techniques known to the art, or the loops may be ground or cut on one or both sides to form tufts. As is shown in the embodiment of FIG. 4, the substrate may have cut tufts formed on one side and then be turned upside down to have cut tufts formed on the opposite side so that the material has intermingled cut tufts and loops on both sides.

An adhesive or binder layer is spread-coat on one side of the substrate in an amount sufficient to completely saturate the substrate but still allow the fiber tips to make physical contact with the fiber tips of an opposing ply. It is desirable that the binder have a viscosity such that upon warming, it will penetrate around the individual fibers. The application temperature of the adhesive will be from about 65° to about 110° F. and the room temperature viscosity will range from about 10 to about 1000 poise with a preferred range being from about 50 to about 500. In general it is desired that the outer surfaces of the outermost plies are saturated in order to avoid the risk of voids in the penultimate layers.

A plurality of plies are cut to size and stacked on a building form. If the plies have a polarity, such as a tufted and a looped side, care is taken to stack the plies in the proper polar orientation, such as with tufts opposing loops, i.e., cut pile opposing loop pile. Heat and pressure are applied to the stacks of substrate to urge the fibers of opposing plies into greater cooperation and to cure the binder. Normally this is performed in an autoclave with a vacuum bag in order to remove volatiles. It is preferable that the plies are laid up and setting conditions are applied such that the formation of voids and trapped air between the plies is avoided.

The fibers have a structural tie-in or are anchored in substrates such that there is less possibility of propagating a longitudinal crack at the tip or the base of the fibers.

The invention will be better understood by reference to the following examples.

EXAMPLES

Double Cantilever Beam Delamination Test

A 7 in.×6 in.×0.285 in. sample of composite was made as follows:

Six plies were prepared from an all glass substrate having woven loops on either side. Cut pile was formed on one side by cutting the tips from the loops. The tips of the loop were soaked in water and dried in a forced air oven for one hour at 220° F., before the tops were cut off. This wetting and drying made the tops hard and stiff. They were easy to cut off, using a small, high speed, air driven grinding tool.

A 0.008 inch film of epoxy was applied to the bottoms of each layer of the textile, covering the looped (uncut) pile. The plies were then stacked so that the cut pile faced an adjacent looped pile. A release film material was used to introduce a two inch flaw between the third and fourth plies. To stiffen the structure, an additional ply of conventional glass-epoxy woven prepreg was added to both top and bottom of the composite.

The sample was compression molded between two aluminum plates. The temperature during the cure cycle was ramped from room temperature to 250° F. over a 20 minute period. It was held at this temperature for an additional two hours. The pressure at start was 0 psi, and was gradually increased to 200 psi during the 20 minute ramp. This pressure was maintained for the duration of the cure cycle.

A double cantilever beam delamination sample was cut from the cured composite. It was necessary to increase the laminate stiffness by adding 10 plies of conventional woven cloth impregnated with epoxy on each side to strengthen and stiffen the sample in order to avoid crack initiation in the outer layer, i.e., the glass epoxy prepreg. After adding the additional backing, a successful test was conducted for delamination of the composition between the third and fourth plies. The energy necessary to propagate the flaw was 52.6 in-lb/in$^2$.

A control test specimen was prepared using the same general procedure, except that the tufts were pulled out of the ground cloth material prior to layup. The crack propagated easily within the mid layer of this material, hence there was no need to add the additional backer material. The energy necessary to propagate the crack was 2.77 in-lb/in$^2$.

The Screwdriver Wedge Test

As a rough check on the results of the double cantilever beam test, a screwdriver was used as a wedge to cause fracture of a test specimen.

The screwdriver was nominally 10.75 inches long, with a 5.65 inch long shaft and 0.315 inch shaft diameter. At its tip, the screwdriver blade was 0.33 inch wide and 0.045 inch thick.

Fracture at the release film interface was initiated by a knife blade and the screwdriver blade inserted. The experimenter, seated in a chair, leaned forward so that the far end of the test specimen contacted the floor. He then exerted downward force on the handle of the screwdriver so that its wedging action caused slow fracture of the test specimen starting at the point of blade insertion and propagating the length of the test specimen.

The force required approximated the weight of the head, arms, and upper torso of the experimenter estimated at about 50 pounds. By contrast, the control specimen split its entire length quickly and easily. Since the test specimens were one inch wide, a 50 pound force required to propagate a crack, could cause 50 in-lb of work for each one square inch of fracture surface. Neglecting frictional losses, this approximates the 52.6 in-lb/in$^2$ result obtained using the double cantilever beam test method.

While in accordance with the Patent Statutes, the best mode and preferred embodiment has been set forth, the scope of the invention is not limited thereto, but rather by the scope of the attached claims.

What is claimed is:

1. A composite comprising:
   at least two layers, each layer comprising a substantially planar substrate having a first side and a second side and having a plurality of fibers, said fibers forming fiber tips on the first side and the second side of said planar substrate, and said fibers forming loops on at least the first side of the substrate so as to structurally anchor the fibers to the substrate;
   said layers being stacked in opposition so that the fiber tips on one layer cooperate with the fiber tips of the opposing layer and form interstices therebetween;
   and a binder which substantially impregnates the interstices.

2. A composite as set forth in claim 1, wherein the fibers form loops on the first side of the substrate and cut pile tufts on the second side.

3. A composite as set forth in claim 2, wherein the cut pile tufts extend from said substrate at an angle of about 70 degrees to about 110 degrees to the plane of the substrate.

4. A composite as set forth in claim 3, wherein said substrate is woven.

5. A composite as set forth in claim 1, wherein the fibers further form cut pile tufts on the first side and the second side.

6. A composite as set forth in claim 1, wherein said binder is a hardenable plastic.

7. A composite as set forth in claim 6, wherein said binder is a thermoset.

8. A composite as set forth in claim 7, wherein said substrate comprises one or more material selected from the group consisting of carbon, glass, graphite, and polyester and said fibers comprise one or more material selected from the group consisting of glass, carbon, polyester, nylon and polyarimide.

9. A composite comprising:
   a plurality of opposing layers, said layers sandwiching a hardenable binder and each layer comprising a substantially planar substrate having fibers which interlock therewith to form fiber tips on either side of said substrate, said fiber tips forming loops on at least one side of the substrate so as to structurally anchor said fibers to said substrate, fiber tips of one layer cooperating with fiber tips of an opposing layer,
   whereby the delamination energy required to cause separation of a first layer opposing a second layer is more than 10 in-lb/in$^2$.

10. A composite as set forth in claim 9, wherein said delamination energy is more than 15 in-lb/in$^2$.

11. A composite as set forth in claim 9, wherein said fibers form loops on one side of the substrate and cut tufts on the second side.

12. A composite as set forth in claim 9, wherein said fibers form cut tufts on both sides.

13. A composite as set forth in claim 9, wherein the fibers extend from said substrate at an angle of about 70 degrees to about 110 degrees to the plane of the substrate.

14. A composite as set forth in claim 13, wherein said substrate comprises one or more material selected from the group consisting of carbon, glass, graphite, and polyester and said fibers comprise one or more of material selected from the group consisting of glass, carbon, polyester, nylon and polyarimide, and said binder is a thermoset.

15. A composite as set forth in claim 9, wherein said delamination energy is more than 20 in-lb/in$^2$.

16. A method of making a composite material comprising:
   forming a ply comprising a substantially planar substrate having a first and a second side and having a plurality of fibers which extend through the plane of said substrate to form fiber tips on said first side and said second side and which extend from at least one side of said substrate at an angle from about 70 degrees to about 110 degrees from the plane of said substrate to form a pile, said substrate being formed from a textile having loops on both sides and the pile is formed by cutting the tops of the loops;
   applying a hardenable binder to at least a side of the ply;
   stacking at least two of the plies together so that the fiber tips of one ply cooperate with the fiber tips of an opposing ply and so that the binder and the pile are intermediate the two plies; and
   subjecting the stack to temperature and/or pressure conditions so as to cause the binder to harden.

17. A method of making a composite material as set forth in claim 16, wherein said substrate comprises one or more material selected from the group consisting of carbon, glass, graphite, and polyester and said fibers comprise one or more material selected from the group consisting of glass, carbon, polyester, nylon and polyarimide, and said binder is a thermoset.

* * * * *